Sept. 16, 1924.
S. SIMON
1,508,944
VALVE
Filed Aug. 6, 1923
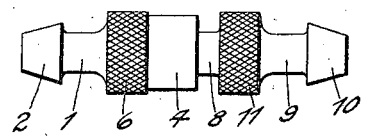
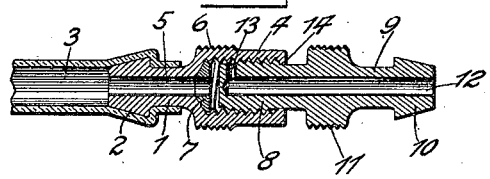
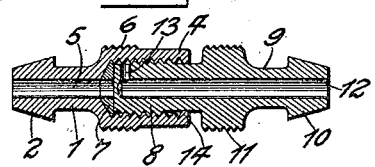
Inventor:
Selig Simon,
by Rippey Kingsland,
His Attorneys.

Patented Sept. 16, 1924.

1,508,944

UNITED STATES PATENT OFFICE.

SELIG SIMON, OF ST. LOUIS, MISSOURI.

VALVE.

Application filed August 6, 1923. Serial No. 655,797.

*To all whom it may concern:*

Be it known that I, SELIG SIMON, a citizen of the United States, residing at the city of St. Louis and State of Missouri, have invented a new and useful Valve, of which the following is a specification.

This invention relates to valves.

An object of the invention is to provide a valve of a minimum number of parts designed and adapted for use to retain air under compression and which embodies a structure that will prevent leakage of the air.

Another object of the invention is to provide a valve of the type mentioned comprising two parts, one of which is screwed within the other and each having an air passage therethrough, in combination with means whereby a perfect seal is formed when the two parts are in closed position, and means for preventing separation of said parts.

Other objects will appear from the following description, reference being made to the drawing in which Fig. 1 is a side elevation of my improved valve.

Fig. 2 is a longitudinal sectional view of the valve in open adjustment.

Fig. 3 is a longitudinal sectional view of the valve closed.

One part of the valve includes a stem 1 having a flanged head 2 for engagement with a tube or hose 3. Said part has a barrel 4 at the opposite end which is internally threaded and communicates with a passage 5 opening to the stem 1 and into the tube or hose 3. The barrel 4 has a knurled or spotted part 6 for manual engagement when the valve is being opened or closed.

An elastic gasket 7 is seated against the inner end of the barrel 4 and has a hole therethrough communicating with the passage 5. Preferably the gasket 7 is engaged by the threads within the barrel and is thereby held from displacement when the valve is open.

The other part of the valve comprises a stem including a threaded portion 8 screwed within the barrel 4 and having its inner end flat, that is at right angles to the axis of the stem so that when the said part is screwed to closed position it presses closely against the gasket 7 forming a perfect seal. Said part also comprises an outer portion 9 provided with a flanged head 10 for connection with the hose or tube of an air pump when it is desired to inflate the device with which the valve is connected. An enlargement 11 between the parts 8 and 9 is provided with a spotted or knurled periphery for manual engagement in opening and closing the valve.

This second part of the valve is provided with a longitudinal hole 12 extending from the outer end inwardly to a point short of the inner end, and with a radial hole 13 from the passage 12 through one side of the threaded part 8. Thus when the two parts are screwed to closed position the passage 12—13 is entirely out of communication with the passage 5 and it is impossible for air to pass through the valve; but, when the parts are screwed to open position as shown in Fig. 2 the end of the outer member of the valve is removed from the gasket 7 leaving a space between the gasket and the inner end of the outer member of the valve. This permits the air to pass through the passage 12—13 and thence through the passage 5 to inflate the object with which the valve is connected.

An important feature of the invention consists of means for preventing separation of the two parts. In the embodiment shown said means comprises a thickened part 14 formed on the outer end of the threaded barrel 4 after the two parts have been screwed together. When the threads of the portion 8 of the outer member of the valve contact with the thick portion 14 of the barrel unscrewing of the two parts is stopped. Thus, the part 14 forms an abutment or stop for the threads on the portion 8 of the outer member of the valve, preventing separation of the valve parts, but permitting sufficient movement thereof to open and to close the valve.

My improved valve is designed and adapted for various uses and is of convenient operation and simple construction. The parts may be made of any desired strength or dimensions and may be varied in other particulars without departure from the nature and principle of the invention. I do not restrict myself unessentially, but what I claim and desire to secure by Letters Patent is:—

A valve comprising a member composed of a relatively large barrel having internal threads, a relatively small stem extending from one end of the barrel and having a passage therethrough opening into the barrel, and a flanged head near the end of the stem; in combination with another member having a threaded flat inner end screwed into the barrel and having a passage from the other end to a point near the inner end and thence radially through the side thereof, a flanged head near the outer end of said second member, and an elastic gasket seated against the inner end of said barrel and engaging the threads of said barrel.

SELIG SIMON.